United States Patent [19]
Kincaid

[11] 3,712,456
[45] Jan. 23, 1973

[54] CHAIN LINK FIXTURE

[75] Inventor: Frederick L. Kincaid, Portland, Oreg.

[73] Assignee: Esco Corp., Portland, Oreg.

[22] Filed: May 14, 1971

[21] Appl. No.: 143,303

Related U.S. Application Data

[63] Continuation-in-part of Ser. No. 840,680, July 10, 1969, abandoned.

[52] U.S. Cl. ................................................. 198/175
[51] Int. Cl. ............................................. B65g 19/08
[58] Field of Search ...................... 198/175, 176, 200

[56] References Cited

UNITED STATES PATENTS 231,186  8/1880  Neacy ................................. 198/176

*Primary Examiner*—Edward A. Sroka
*Attorney*—Dawson, Tilton, Fallon & Lungmus

[57] ABSTRACT

A fixture for connecting into a chain link includes a partial chain link cast integrally with the body of the fixture to form a solid unitary part. The partial chain link of the fixture has forwardly and rearwardly extending loops which are spaced to define a socket for receiving solid links of the adjacent connecting chain sections. A cap member is received in the socket to complete the partial link. The cap is welded to the partial link at front and back positions, and it is welded to the body of the fixture at transverse side locations. The invention eliminates the need for weld links in the connecting chain sections or mechanical fasteners in the fixture for holding adjacent chain sections, while providing a stronger fixture.

14 Claims, 15 Drawing Figures

Inventor
Frederick L. Kincaid
by: Dawson, Tilton, Fallon & Lungmus
Atty's

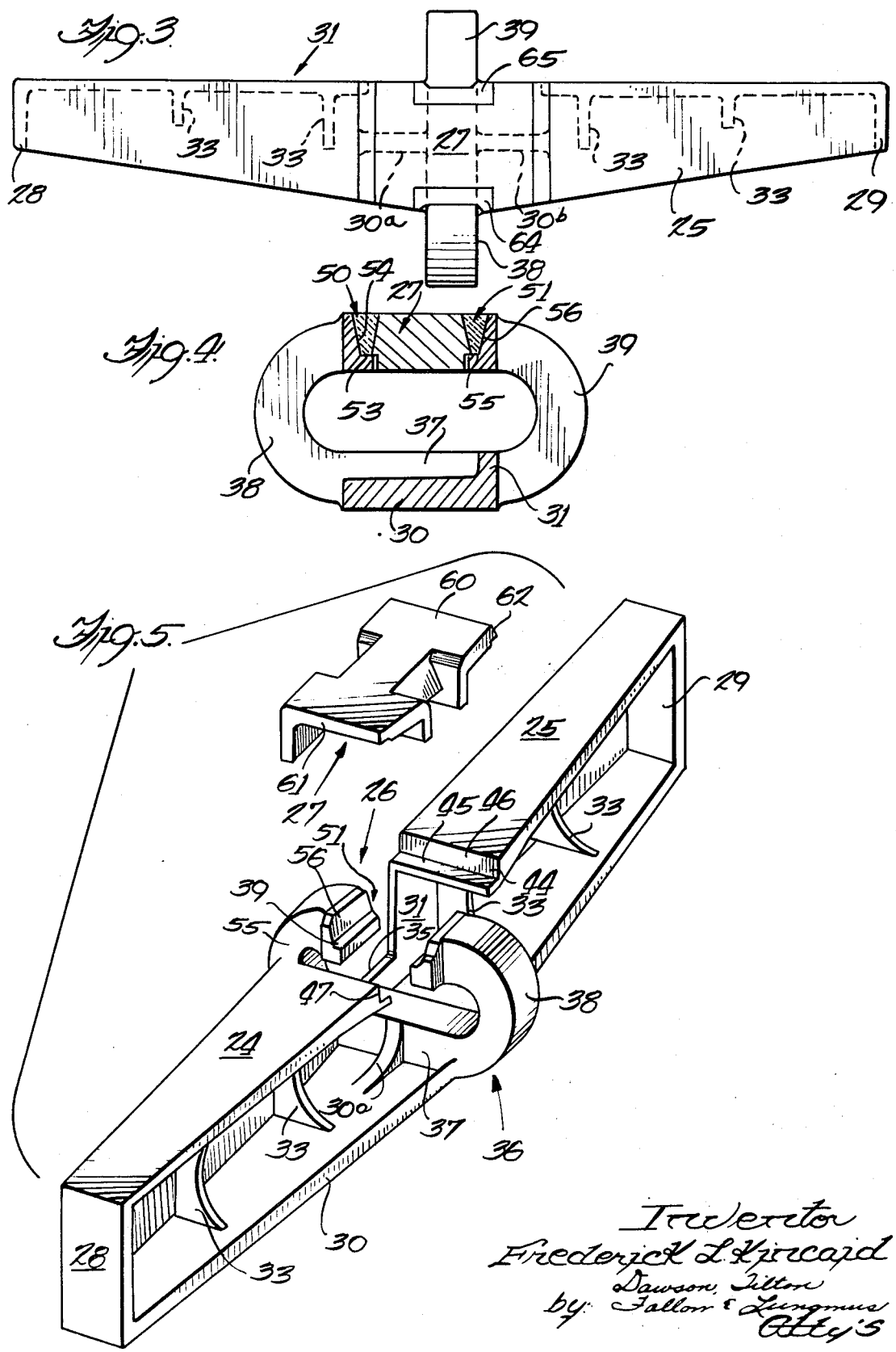

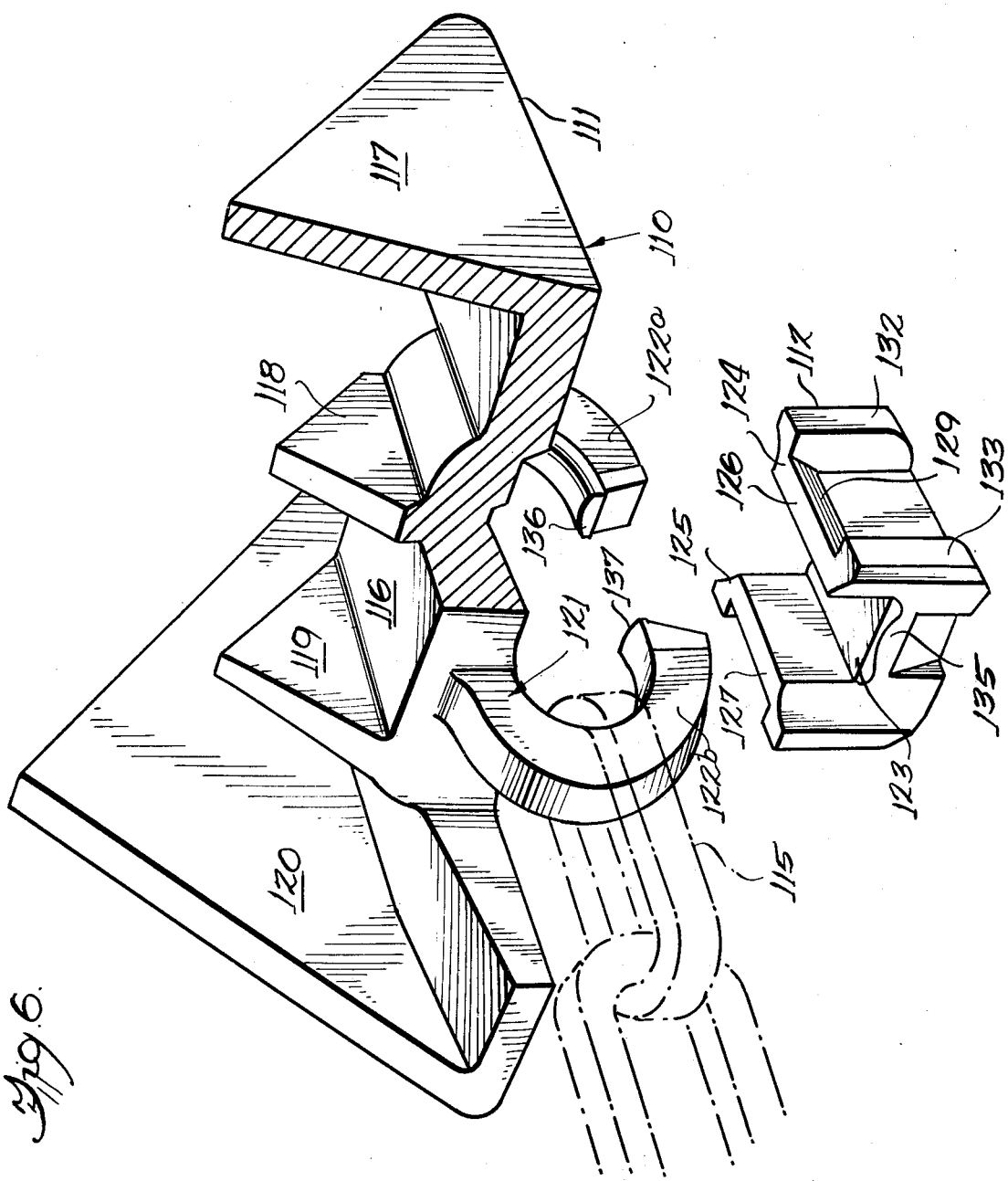

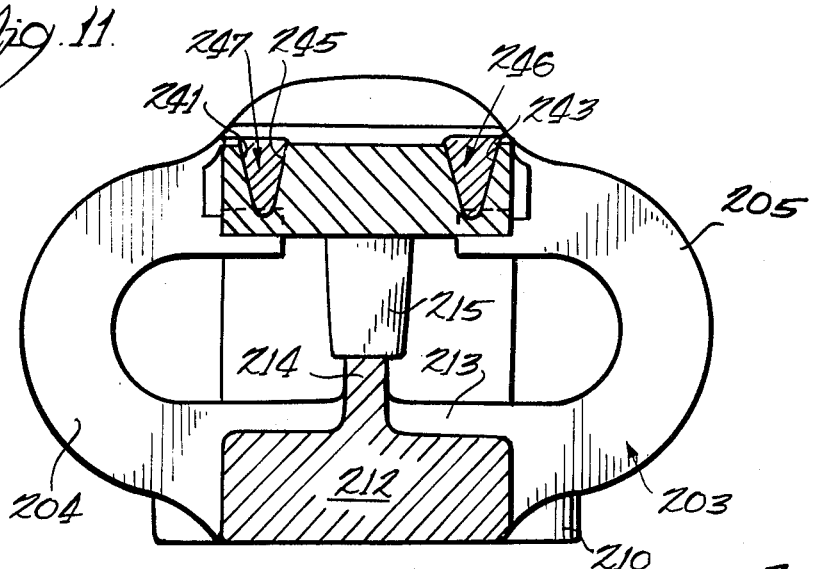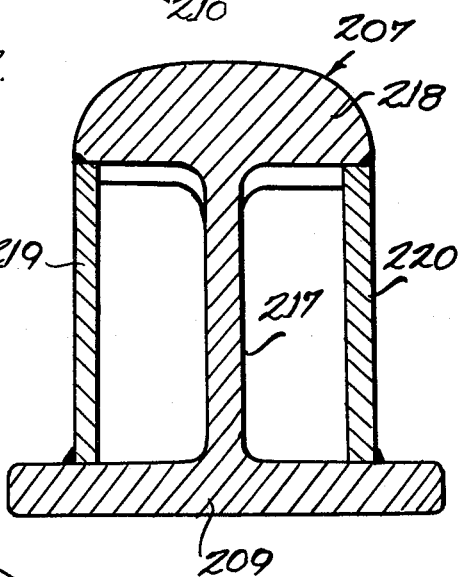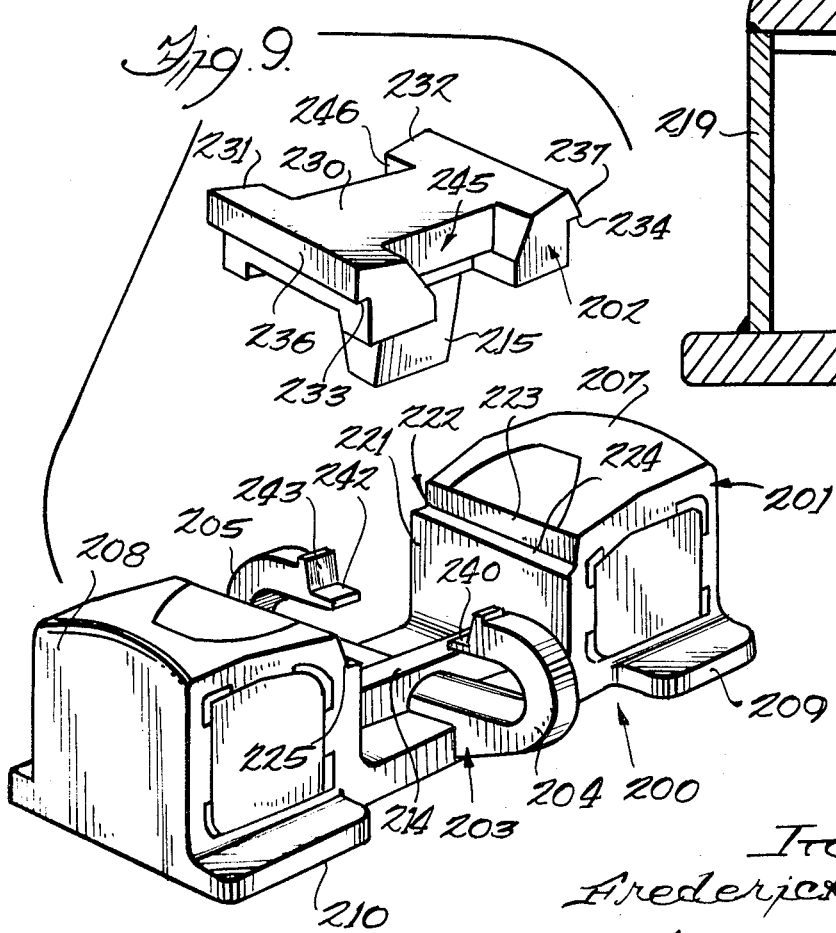

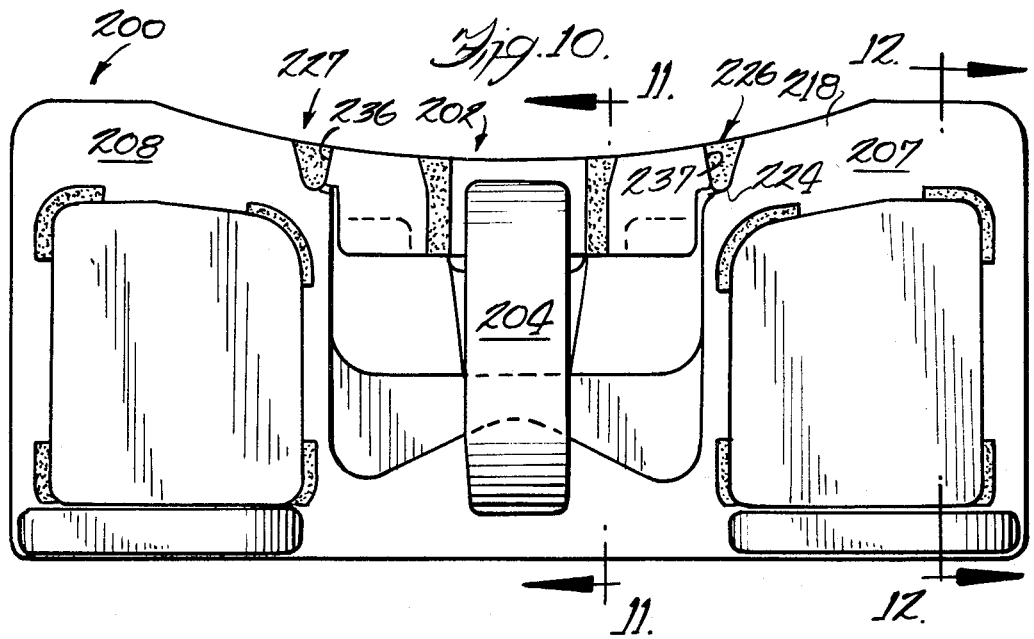
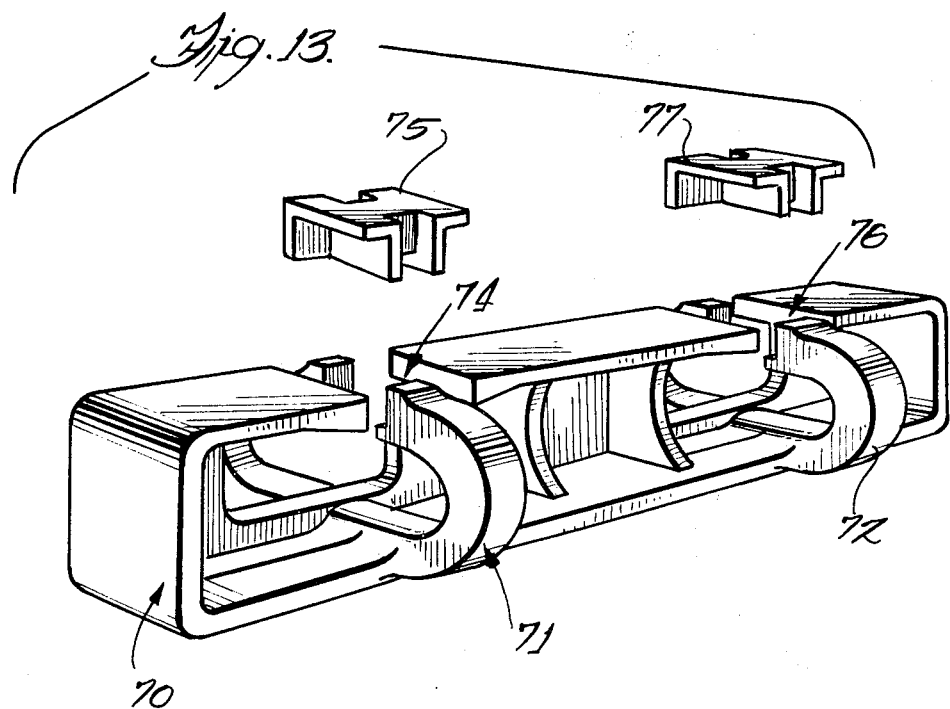

Inventor
Frederick L. Kincaid
by Dawson, Tilton, Fallon & Lungmus
Atty's

CHAIN LINK FIXTURE

RELATED APPLICATIONS

This is a continuation-in-part application of my copending, co-owned application entitled "Integral Conveyor Flight", Ser. No. 840,680, filed July 10, 1969, and now abandoned.

BACKGROUND OF THE INVENTION

1. Field of the Invention

The present invention relates to an improved fixture adapted to be inserted as an integral part of a chain link conveyor system. Such fixtures may be used, for example, to convey logs and other materials in pulpmills, sawmills, and plywood plants.

Typically, material such as cut logs or larger whole logs is transported for processing by drag chains mounted in troughs. At spaced intervals along the chain, a fixture is provided to engage the material and carry or push it along with the longitudinal movement of the drag chain. Although the invention is not so limited, such fixtures may include a transverse flight which pushes pulp material along or a log chair which is primarily adapted to supporting long, whole logs while conveying them. The conveyor flights have particular application in places where there is an upward incline so that the material does not slip when it is caught by the transverse conveyor flights. The log chairs may be of a number of different types, including platforms with upwardly-projecting teeth for engaging a log in non-slip fashion.

2. Known Replaceable Fixtures

The fixtures which are attached to the chain link sections bear most of the shock and abrasion under the rugged operating conditions of a conveyor; and they occasionally break and must be replaced. The primary source of breakage occurs in the special-fitting link connected to the body of the fixture itself because it is subjected to much greater stresses from the other, complete chain links and from the fixtures.

Early attempts to provide replaceable conveyor links employed bolts, cotter pins, removable fixtures and the like, which usually connected a partial link to the body of the fixture. In other cases, T-shaped bars were inserted in slots or grooves within the fixture so as to releasably secure the partial link to the fixture. The primary difficulty with these earlier designs is that the slots or grooves weaken the fixture and reduce either the vertical or horizontal bending moment of the fixture. Further, because of the relatively loose fit of the mechanisms holding the length to the body of the fixture, the interlocking parts wear rapidly.

Present commercial fixtures employ a whole link which is integrally-cast with the body of the fixture and has forward and rear loops which close on each other to receive respectively a forward section and a rear section of a conveyor chain. The end links of each chain section require a special type of connecting link for attachment to each of the loops of the fixture link. These special end links are referred to "weld type" connecting links; and they employ a knock-out or removable portion in one of the straight center sections of the link which, when removed, provides an opening in the link sufficient to receive the end radius of a fixture link. The knock-out is then welded back in place after connection to a fixture.

Thus, in the case of replacing a fixture, the existing weld links are cut, the defective fixture with its integrally-cast link is removed, and a new fixture is attached to the chain sections by means of two new weld links.

In this specification, the phrase "integrally-cast" is given the specific meaning of a unitary body cast entirely at one time so as to provide a continuous member free of weldments and mechanical connections of the type used in the earlier fixtures mentioned above. In particular, it is used to distinguish from the type of conveyor flights, etc. wherein a separate open link was removably attached to a conveyor flight by means of bolts, cotter pins, or special fittings.

SUMMARY

In the present invention, a partial link (having a C shape) is cast integrally as a part of the body of a transverse flight link, log chair, or the like. The partial link has two end loops extending respectively forwardly and rearwardly of the fixture. One end of each end loop is integrally cast with the body of the fixture, but the other end of each link is free, so as to provide a socket for receiving the end connecting links of adjacent chain sections, both before and after the position of the fixture.

After the adjacent sections of the drag chain are connected to the open or partial link of the fixture, a cap or plug is received in the socket and welded fore and aft to the distal ends of the fixture link thereby closing it. Further, the sides of the cap are welded to the body of the fixture so that the cap becomes an integral portion of the fixture and the open ends of the link become rigidly secured to the body of the fixture via the cap.

The present invention, therefore, obviates the need for the prevailing type of weld links located in chain sections adjacent each fixture connected to the chain. When assembled to adjacent chain sections, the fixture is an integrally-formed member without special fastenings, bolts, cotter pins or the like, which wear rapidly and increase maintenance. Further, the placement of the cap counteracts the pull of the chain and keeps the C-shaped link from opening up.

Other features and advantages of the present invention will be apparent to persons skilled in the art from the following detailed description of three separate embodiments of the invention accompanied by the attached drawing wherein identical reference numerals will refer to like parts in the various views.

THE DRAWING

FIG. 3 is a plan view of the flight of FIG. 2;

FIG. 4 is a cross-section view taken through the sight line 4—4 of FIG. 2;

FIG. 5 is a perspective view, taken from above, showing the flight link and its cap prior to assembly;

FIG. 6 is a perspective, exploded view, partially broken away, of a log chair incorporating the present invention;

FIG. 9 is a perspective exploded view of a second log chair incorporating the present invention;

FIG. 10 is an end elevational view of the log chair of FIG. 9;

FIG. 11 is a side elevational view taken through the sight line 11—11 of FIG. 10;

FIG. 12 is a cross-section view taken through the sight line 12—12 of FIG. 10;

FIG. 13 is a perspective view of a double-link conveyor flight incorporating the present invention;

DETAILED DESCRIPTION

Although this invention is not so limited, there are three different types of fixtures disclosed herein which are adapted to be connected to sections of a drag chain, all of which incorporate the present invention. Further, one of the fixtures, the transverse flight link, is shown in a modification wherein two separate C-shaped links are integrally cast with the body of the fixture.

In its broader aspects, the invention contemplates a conveyor fixture of any desired shape or function which has integrally cast with it a partial chain link in the form of a C. The end loops of the partial link extend forwardly and rearwardly of the fixture along the direction of travel of the fixture. In assembling the fixture to forward and rear chain sections, the nearest links are inserted into the socket formed by the opening in the partial link so as to engage respectively the forward and rear loops of the partial link. Next, a cap is placed in the socket to complete the partial link, and the cap is welded at forward and rear locations to the distal ends of the C-shaped partial link and at its sides to the body of the fixture. Although the invention is not so limited, the cap is preferably cast as a single body. Hence, the cap is hereinafter sometimes referred to as a "cast cap" without intending to restrict the invention.

Figure 1:
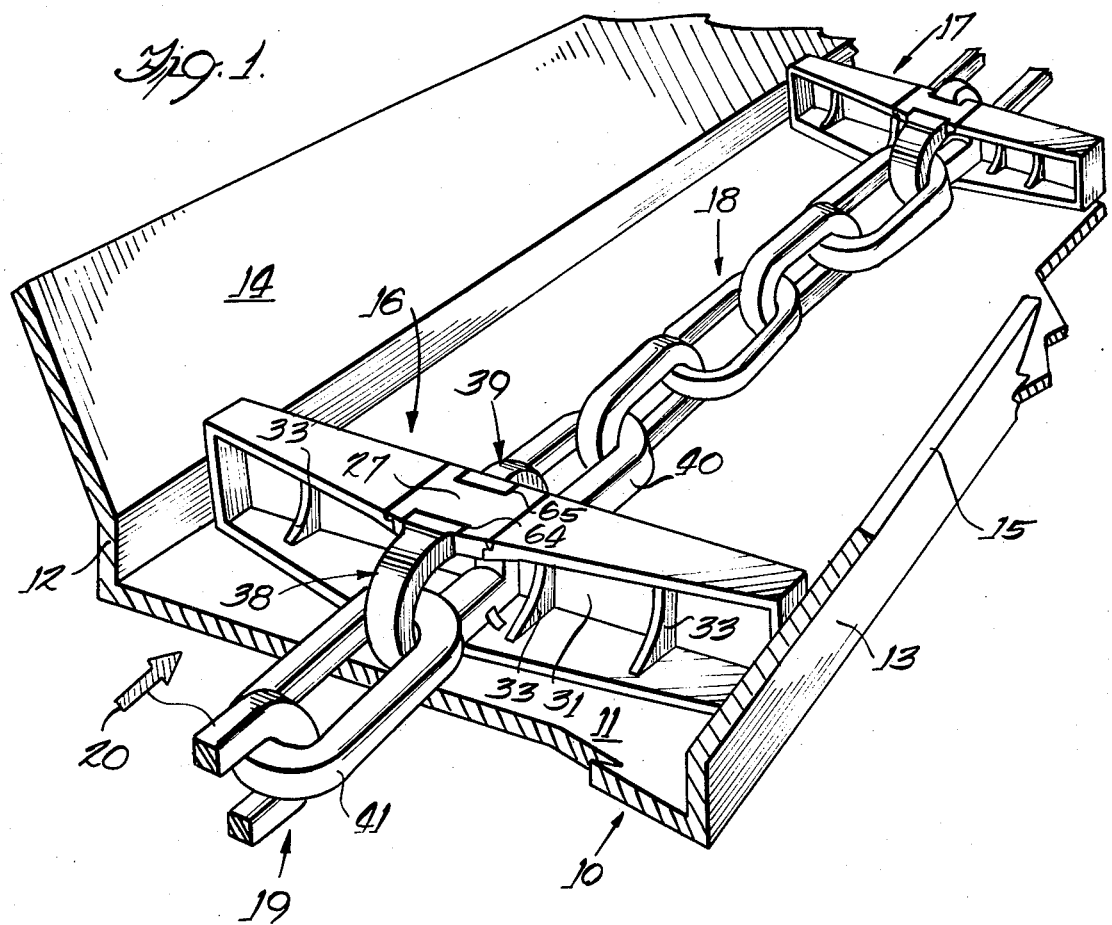
FIG. 1 is a perspective view of a conveyor flight system incorporating the present invention.

Turning now to FIG. 1, reference numeral 10 generally designates a conveyor trough having a flat base 11 which may be either horizontal or inclined as illustrated. Side walls 12 and 13 extend upwardly of the bottom 11; and outwardly flaring hopper walls 14 and 15 extend from the top of the side walls 12 and 13 respectively.

Received within the channel defined by the conveyor base 11 and its side walls 12 and 13 are a number of fixtures commonly called conveyor flights (two of which are shown in the drawing and generally designated respectively by reference numerals 16 and 17) for moving materials such as pulpwood logs, blocks, slabs, chips, sawdust, etc. Adjacent flights are connected together through the agency of link chain sections, the chain section interconnecting flights 16 and 17 being designated by reference numeral 18, and a portion of the link chain connecting flight 16 with a subsequent flight being generally designated by reference numeral 19.

In the illustration, the flights 16 and 17 are used to convey material in the direction of the solid arrow 20. Each of the flights 16 and 17 may be identical in structure and operation; hence, only one of the flights need be described in greater detail here for a full understanding.

Figure 2:
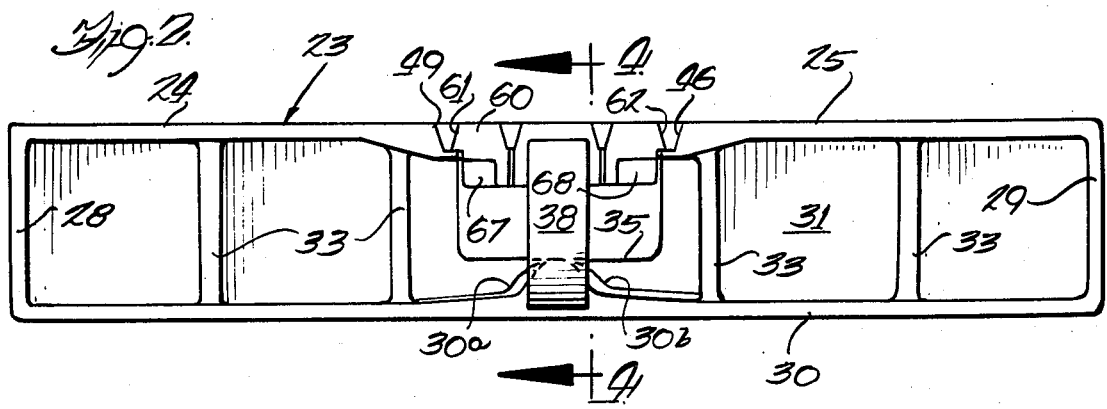
FIG. 2 is a rear elevational view of a conveyor flight illustrated in FIG. 1.

Referring then in particular to the flight 16, as can be seen in FIG. 2, it has a rectangular cross section taken transverse of the direction of travel of the flight; and it includes a top plate generally designated by reference numeral 23 which includes left and right side sections 24 and 25 respectively. As illustrated best in FIG. 5, the side sections 24 and 25 of the top plate 23 define a central aperture 26 which forms a receptacle for receiving an integral cast cap generally designated 27. The flight 16 also includes generally vertical side flanges 28 and 29 as well as bottom flange 30 and a front plate 31.

The box-section flight design illustrated in FIG. 2 has been found to offer a maximum of strength and longer wear life. The symmetry between the top flange 23 and bottom flange 30 enables the flight to convey materials on both carry and return runs.

Four supporting ribs or webs 33, two on either side of the center of the flight, brace the faceplate 31 against the top flange 23 and bottom flange 30.

As seen best in FIGS. 2 and 5, the faceplate 31 defines a central U-shaped aperture 35 which communicates with the aperture 26 formed in the center of the top flange 23. Cast integrally with the flight 16 is a C-shaped link generally designated by reference numeral 36. The C-shaped link 36 includes a straight or center section 37 which is cast integrally with the bottom flange 30 of the flight 16 and extends in the direction of travel of the flight, and first and second loop sections 38 and 39 (herein sometimes referred to as end radii). The flight link 36 is braced against the bottom flange 30 by side ribs 30a and 30b (FIGS. 2, 3, and 5).

The forward end loop 39 projects in front of the faceplate 31 for connecting with an end link 40 of the chain section 18. As cast, the upper portions of the end radii 38 and 39 form distal ends which are separated as illustrated in FIG. 5 so that the elongated hollow defined by the partial link 36 communicates with the aperture 26 in the top plate 23 and with the U-shaped aperture 35 formed in the faceplate 31 to form a socket for receiving whole end links of adjacent chain sections. Thus, the end link 40 of the chain section 18 is placed over the forward loop 39 which loop is received in the hollow defined by the link 40. Similarly, the leading link, designated 41 in FIG. 1, of the succeeding chain section 19 is similarly fitted onto the rear loop 38 of the C-shaped fixture link 36.

Referring now in particular to FIG. 5, the inboard end of the side section 25 of the top flange 23 is provided with a groove 44 extending in the direction of travel of the link, the lower surface of which provides a seating flange or lip 45 for receiving the top plate 27. The side surface 46 of the groove 44 (FIG. 2) is inclined outwardly of the center of the link to partially define a weld pocket for reducing the amount of welding required during fabrication. A complementary groove 47 is formed at the inboard edge of the side section 24 of the top flange 23; and, again, the groove 47 is defined by a seat 48 and an inclined side edge 49. Similarly, the upper, opposing edges of the rear and forward loops 38 and 39 of the flight link define grooves 50 and 51 which extend transverse of the direction of travel of the flight. As seen best in FIG. 4, the groove 50 is defined by a lower seating surface 53 and a rearwardly inclined side surface 54. The groove 51 includes a lower seating surface 55 for receiving the cap 27 and a forwardly inclined side surface 56.

Turning now to the cast cap 27, and in particular to FIG. 5, it includes a generally horizontal top plate 60 formed in the shape of an H when viewed along the direction of travel of the flight. The side edges of the top plate 60 of the cap 27 are inclined as at 61 and 62 of FIG. 2 so that when the cap is received in the upper aperture 26 between the side sections 24 and 25 of the top flange 23, the slanted edge 61 cooperates with the slanted edge 49 of the side section 23 to form a weld pocket to reduce the amount of welding required. Similarly, the slanted edge 62 of the cap 27 cooperates with the inboard slanted edge 46 of the side section 25 of the top flange 23 to form a weld pocket. Similar weld pockets identified by reference numerals 64 and 65 in FIG. 3 are formed for securing the rearward and forward crevices of the H defined by the cap 27 respectively to the upper opposing edges of the end radii 38 and 39 of the flight center link. These weld pockets are shown in heavy dark lines in FIG. 1.

It will be observed, therefore, that the cap 27 is cast in a shape which will enable it to fill in the socket after the forward and rear chain sections have been attached to the fixture. The cap also cooperates with the body of the fixture and the distal ends of the partial link 36 to define weld pockets for securing the cap to the distal ends of the partial link at fore and aft positions and to the body of the fixture at side positions. Directions are referred to in relation to the direction of travel of the chain and fixture.

The cast cap 27 also includes first and second side flanges which depend from the forward edges of the H defined by the top plate 60; and these are designated respectively by reference numerals 67 and 68 in FIG. 2. As shown therein, the front plates 67 and 68 are received in the aperture 35 in the faceplate 31 of the flight; and they lie astride the forward radii 39 of the center link 36 to form a continuation of the faceplate 31.

As best seen in FIG. 2, the vertical dimension of the end loops 38 and 39 is somewhat less than the vertical dimension of the box-shaped flight. The vertical dimension of the links in the attaching chain sections is also less than the height of the flight. Thus, when the chains are under tension, the individual chain sections extend between adjacent flights and are suspended therebetween so that they are prevented from dragging along the bottom of the conveyor thus preventing wear on the chains and on the conveyor base.

Turning now to FIG. 13, there is shown a modification of the flight link illustrated in FIGS. 1–5, which is adapted for use in a dual strand conveyor flight link— that is, rather than a single central drag chain interconnecting adjacent fixtures, there are two separate drag chain sections interadjacent fixtures. In FIG. 13, the conveyor flight link is generally designated by reference numeral 70, and integrally cast with the flight link 70 are the first and second C-shaped partial links 71 and 72, each of which is similar in structure to the previously described link 36. The distal ends of the link 70 define a socket generally designated 74 for receiving a cast cap 75 which may be identical to the cap 27. Further, the C-shaped integrally cast link 72 has its distal ends define a socket 76 for receiving a similar cap 77.

As with the previous embodiment, the caps 75 and 77 are welded at fore and aft positions to the distal ends of the flight links 71 and 72 respectively, and the side portions of the caps are welded to the top plate of the flight link 70.

There will now be described a separate embodiment wherein the fixture is a log chair and the partial link is integrally cast to the body of the fixture and extends downwardly therefrom.

Figure 7:
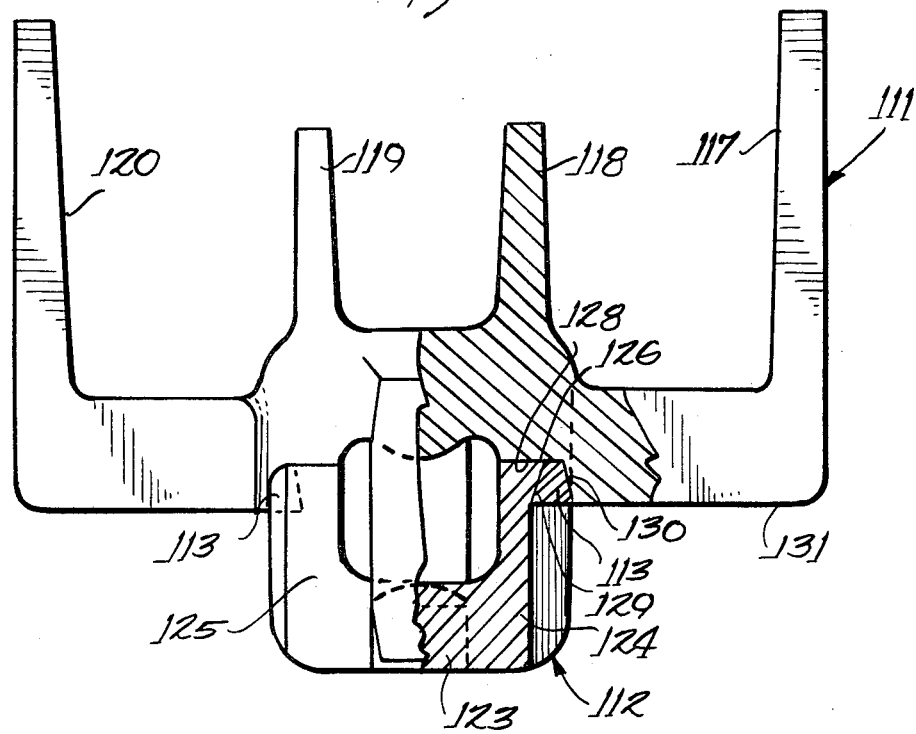
FIG. 7 is an end elevational view, partially in section, of the assembled fixture of FIG. 5.
Figure 8:
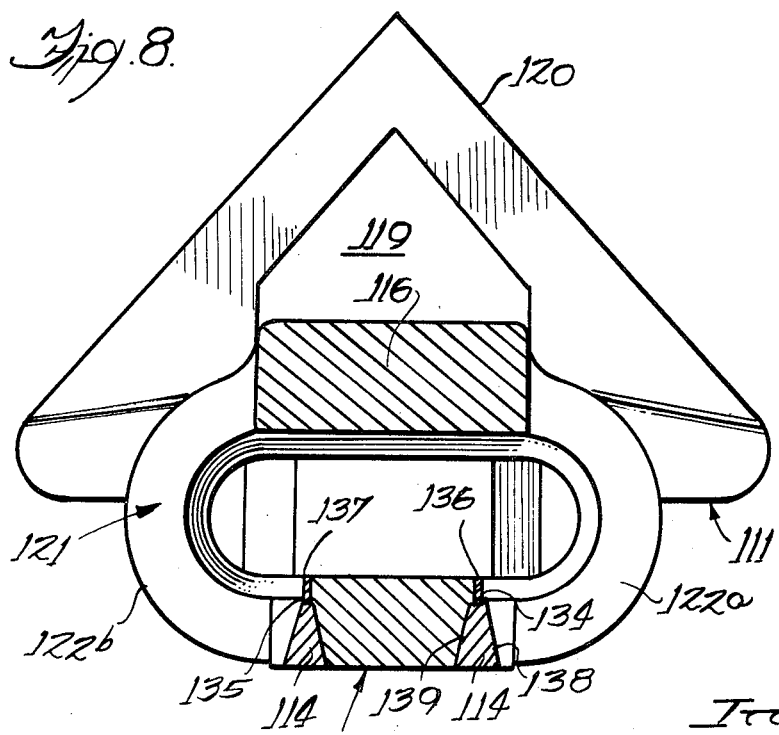
FIG. 8 is a side elevation, partially in section, of the fixture of FIG. 6.

Turning then to FIG. 6, reference numeral 110 generally designates a fixture which is seen to include a main body portion 111 and a cap or insert 112. As illustrated in FIGS. 7 and 8, the body 111 and cap 112 are integrated by welds at fore and aft positions, as at 113 (FIG. 7) and side locations 114 (FIG. 8).

Figure 14:
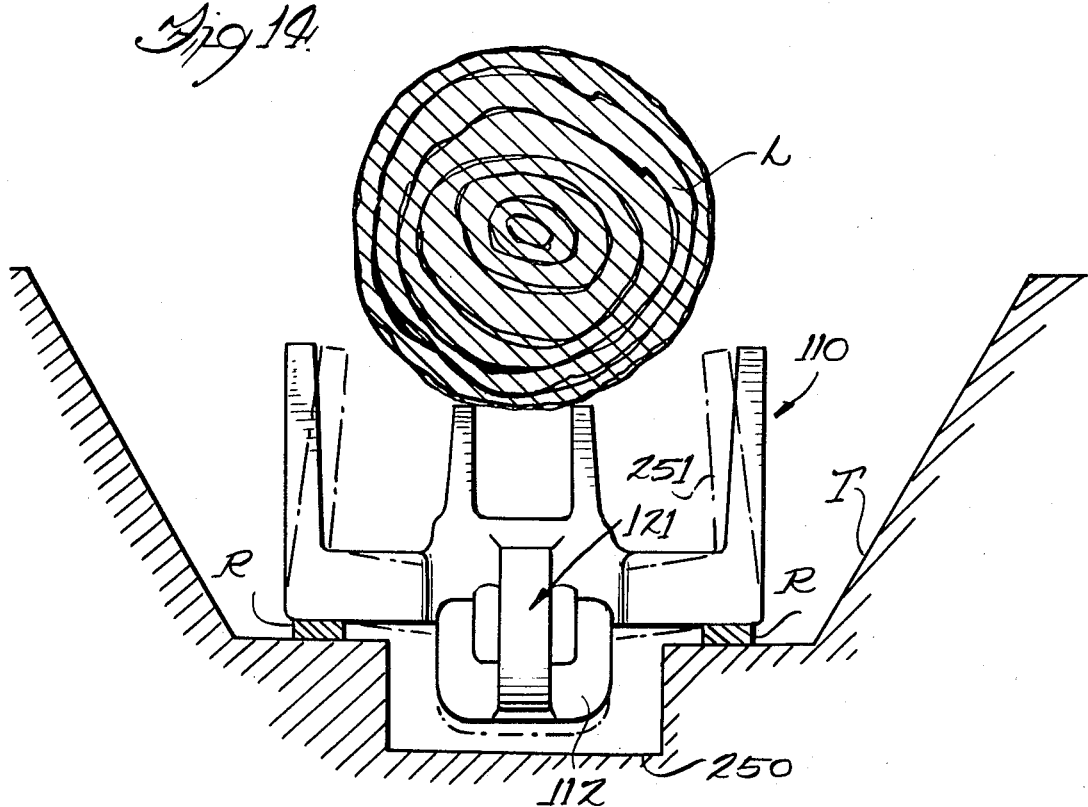
FIG. 14 is an end elevationed view of the log chair illustrated in FIGS. 6–8, illustrating the applied bending moment under load.

It will be appreciated from FIGS. 6 and 14 that the fixture 110 is adapted to be connected as part of a link chain, only a portion of a chain section being shown in FIG. 6 and designated 115. The entire chain, in accordance with conventional practice, is mounted in a trough designated T in FIG. 14 which serves to further confine and direct the logs moving on the chain. The chain, also in accordance with conventional practice, is endless and is entrained about head and tail sprockets (not shown) for the purpose of advancing the chain.

Referring again to FIG. 6, it is seen that the body of the fixture 111 includes an upwardly facing platform 116 which extends (in its longer dimension) transversely of the direction of movement of the chain. The platform 116 is equipped with integral upstanding teeth 117, 118, 119 and 120 which are essentially wedge shape to provide biting action for gripping the logs they support to move the logs without slippage.

Also provided as an integrally cast portion of the platform 116 is a partial or C-shaped link 121 having end loops 122a and 122b. The end loops cooperate with the platform 116 and the insert 112 make up a link for insertion into the chain. The entire body 111 of the fixture is provided as a single casting, suitably heat treated, so as to relieve internal stresses that would occur if the same were fabricated as a plurality of parts. The platform 116 constitutes the upper connection between the end loops 122a and 122b while the insert 112 constitutes the connection between the distal ends of the end loops 122a and 122b.

The insert 112 is essentially U-shaped in end elevation (compare FIGS. 6 and 7). As such the insert 112 has a lower central connective portion 123 and upstanding wall portions 124 and 125. The upper surfaces of the walls 124 and 125 (as at 126 and 127 respectively) abut the under surface 128 of the platform 116. Thus, a load bearing is provided which transmits the pull of the chain through the fixture to the log.

The insert or cap 112 is integrated into the body 111 of the fixture by welding at the two side locations 113 which are positioned immediately adjacent the thrust bearing surfaces 126 and 127 of the cap 112. For the purpose of providing a weld pocket, the walls 124 and 125 are beveled (as at 129 for the wall 124 in FIG. 7)

relative to the wall 124. Thus, the wall surface 129 meets the thrust-bearing surface 126 at an acute angle as can be appreciated from a consideration of FIG. 7. The under surface of the platform 116 has a shoulder to develop the bearing surface 128 and the connective surface 130 which extends between the bearing surface 128 and the outboard under surface 131 of the body 111 is likewise beveled, i.e., inclined at an obtuse angle so as to create the pocket for receiving the weld material 113. The surfaces 129 and 130 are essentially in confronting but diverging relation to form the weld pocket.

It will be appreciated that the connection between the body 111 and cap 112 is symetrical about a longitudinal center line (in the sense of chain movement) so that the structure and connection of the wall 125 of the insert 112 is identical with that just described relative to the wall 124.

Each of the walls 124 and 125 at the fore and aft end thereof is equipped with laterally extending flange portions designated 132 and 133 in FIG. 6. The flange 132 and 133 are provided with vertically facing abutment surfaces 134 and 135. The surface 134 is forwardly facing while the surface 135 is rearwardly facing, assuming the direction of chain movement to be to the right in FIGS. 6 and 8. Thus, the surface 134 (FIG. 8) is in abuting relation with a confronting, conforming surface 136 provided at the rearmost end of the forward end loop 122a. A forwardly facing surface 137 on the rear end loop 122b confronts to surface 135 of the insert 112. Immediately below the surfaces 134 and 136 (or 135 and 137, as the case may be) the associated end loop and link body portion are equipped with diverging or inclined surfaces to define a weld pocket for the transverse welds 114 which connect the distal ends of the partial link 121 to the forward and rear ends of the insert 112.

For example, referring to FIG. 8, the end loop 122a immediately below the surface 136 is equipped with an inclined surface 138. Provided in confronting relations with the surface 138 and arranged at a minor acute angle thereto is provided a surface 139 on the insert 112. Thus, there is a connection between the link portions 121 and 122 which is essentially independent of the load bearing connection achieved by the surfaces 126, 127 of the cap, and surface 128 of the body of the fixture, along with the welds 113.

Turning to the embodiment illustrated in FIGS. 9-12, there is again shown a log chair or support, generally designated by reference numeral 200 and including a body portion 201 and a cap or insert 202. Integrally cast with the body portion 201 is a C-shaped partial link generally designated by reference numeral 203 and including a first end loop 204 and a second end loop 205, arranged with their distal ends in opposing relation. One of the loops 204, 205 extends forwardly of the body 201, and the other extends rearwardly thereof. In this case, the fixture is symetrical about a vertical plane extending transverse of the direction of travel as well as about a vertical midplane extending along the direction of travel.

The body 201 includes first and second side sections 207 and 208. Located beneath the side section 207 is a foot 209 and a similar foot 210 is located beneath the side section 208. The feet 209, 210 are adapted to rest upon and slide along the bottom of a trough or, alternatively, they may be adapted to be supported by rails of the type shown in FIG. 14 and designated by R, although the fixture shown in FIG. 14 is that described above and illustrated in FIGS. 6–8.

Interconnecting the feet 209, 210 is a central bottom wall or platform 212 having a greater thickness than the side feet members 209, 210. The straight center portion of the link 203 that is integrally cast with the body 201 of the fixture is designated by reference numeral 213 in FIG. 11, and it can be seen that the thicker platform 212 of the fixture is integrally cast with the connecting straight portion 213 of the link 203. A transverse rib 214 extends along the top of the platform 212, and it has the function of supplying bulk and strength to the over-all fixture by enhancing the bending moment about a vertical plane transverse of the direction of travel of the fixture as well as by engaging and supporting a central pedestal 215 which is integrally cast with the cap 202. Each of the side sections 207, 208 is the mirror image of the other, so only the section 207 may be described in detail. Extending upwardly from the foot 209 (FIG. 12) and along the transverse center thereof is an upstanding wall 217, at the top of which there is formed an upper bearing member 218 of expanded thickness and forming a portion of the bed for a log. As best seen in FIG. 10, the upper surface of the inner portion of the bearing member 218 is concave in transverse section and, together with the upper surface of the cap 202 and the corresponding inner upper surface of the top of the other side section 208, a log bed is formed. The cover plates 219 and 220 may be provided to keep the cavities formed by the central rib 217 free from material which could otherwise wedge into the fixture.

Turning now to the inner portion of the side section 207, a vertical wall is designated by reference numeral 221, and it extends from the juncture between the foot 209 and the platform 212 of the fixture body upwardly to the bearing member 218, cast integrally on one side with the transverse rib 214 and on the other side with the upright wall 217. At the top of the vertical wall 221, there is formed a ridge extending along the direction of intended travel of the fixture. The ridge is generally designated by reference numeral 222, and it includes a vertical surface 223 and a horizontal surface 224. A similar ridge designated by reference numeral 225 is formed in the upper inner corner of the side member 208.

The ridges 222 and 225, in combination with the cap 202, define respectively side weld pockets 226 and 227 for receiving the weld material and integrating the cap 202 to the body 201 of the fixture. It will be observed from FIG. 10 that the weld pockets 226 and 227 connect the sides of the cap 202 to the body of the fixture, the horizontal surface 224 and a similar surface in the groove 225 acting as support surfaces for the cap during welding.

Turning now to the insert or cap 202, it has a general plan shape in the form of a H with a pedestal 215, already described, depending from the central portion thereof to engage the cross rib 214 of the body of the fixture. The cross bar of the H is designated 230 in FIG. 9, and the legs of the H are designated 231 and 232 respectively. The outer side of the leg 231 has a ledge 233 formed in it to rest upon the bearing surface of the groove 225. Similarly, a ledge 234 is formed in the other leg 232 so as to rest on the surface 224 of the groove 222 when the cap is inserted in the socket to close the partial link. Immediately above the surface 233 is an inclined surface 236 which partially defines the elongated weld pocket formed by the groove 225. Similarly, an inclined surface 237 located immediately above the ledge 234 on the leg 232 of the H diverges from the surface 223 (formed in the groove 222 of the side section 207) to form a second weld pocket (see 226 in FIG. 10).

Turning now to FIGS. 9 and 11, the distal end of the end loop 204 of the partial link 203 is provided with a horizontal support surface 240 and a weld surface 241 which is slightly inclined relative to the vertical so as to diverge away from the socket formed between the distal ends of the open end loops.

Similarly, the distal end of the end loop 205 is provided with a horizontal support surface 242 and an inclined weld surface 243. The cap 202 is provided with a three-sided weld surface 245, all three sides of which are divergent away from the distal end of the end loop 204 when the cap 202 is inserted in the socket. The forward end of the cap 202 is also provided with a similar three-sided weld surface 246, all three sides of which diverge away from the distal end of the loop 205. Thus, first and second weld pockets 246 and 247 are formed to join the forward and rear ends of the cap 202 respectively to the distal ends of the end loops of partial link 203 after the end links of the forward and rear drag chain sections have been coupled to the partial link 203.

Turning now to FIG. 14, the above-described fixture 110 is shown resting on rails R in a trough T having a central depression designated by reference numeral 250 which receives the downwardly depending partial link 121 and the insert 112 after it has been secured to the body of the fixture. The log L resting on the gripper teeth of the fixture causes a central bending force in the fixture which tends to deform the fixture into the shape shown in chain line and designated 251. The deformation is exaggerated for purposes of illustration, but it does point out one of the important features of the invention—namely, that by welding the cap 112 to the body of the fixture to close the socket formed by the partial link 121, the fixture is actually stronger with the partial link than without it. Further, the partial link is stronger because it is integrally cast with the fixture so as to avoid moving parts and the stress induced on the end loops of the partial link are transmitted to the fixture not only through the integrally cast solid portion of the partial link but also through the cap 112 through the welds that have been described herein.

Figure 15:
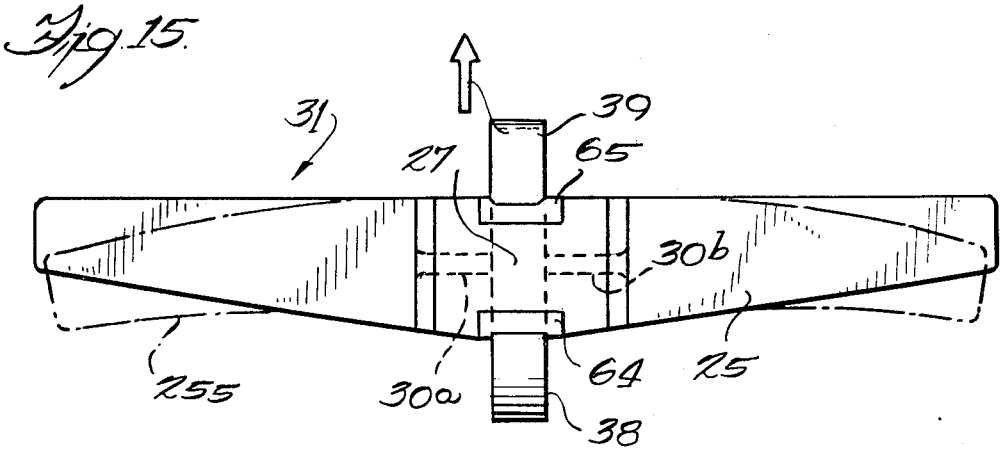
FIG. 15 is a plan view of the conveyor flight link of FIGS. 1–5, illustrating the applied bending moment under load.

The illustration of FIG. 14 shows resistance to bending in a vertical plane, and reference is now made to FIG. 15 wherein there is an illustration of resistance to bending of the inventive fixture in a horizontal plane.

Turning now to FIG. 15, there is shown a plan view of a transverse conveyor flight link of the type illustrated in FIGS. 1–5.

Assuming the flight is being pulled in the direction of the arrow and that there is a uniform heavy load across the face plate of the flight, a bending moment is induced in the flight tending to force the shape of the flight to assume that which is denoted by the chain line 255, although for purposes of illustration again, the deformed shape is exaggerated somewhat. Nevertheless, it can be seen that due to the substantial bulk added by the welded cap 27 being, as it is, secured at both sides to the top of the flight and at forward and rear positions to the distal ends of the partial link. The partial link is, as already mentioned, integrally cast with the body of the fixture and this, in combination with the weld attachment of the cap, eliminates wear surfaces caused by the movement of two contacting parts.

With the invention, it has been found that fixtures can be made with attaching links wherein the links of the fixture are stronger than the chain itself, and this reduces substantially the need to replace the fixtures because the link is the portion of the system which is most abused.

Having thus disclosed a number of embodiments of the invention, including three different fixtures adapted to incorporate the invention, persons skilled in the art will be able to modify certain of the structure which has been illustrated and to substitute equivalent elements for those which have been disclosed; and it is, therefore, intended that all such modifications and substitutions be covered as they are embraced within the spirit and scope of the appended claims.

I claim:

1. A fixture for connecting to forward and rear sections of a chain link comprising an integrally cast body having first and second spaced apart side sections, a partial link with first and second end loops extending respectively in front of and behind said body, one end of each of said end loops being cast integrally with said body of said fixture, the other, distal end of each of said end loops being spaced from each other and from the spaced apart side sections of said body to define a socket for receiving solid links of said forward and rear chain link sections, said side sections of said body extending to respective sides of said chain link sections when said fixture is assembled thereto for engaging and supporting or pushing material along with said chain sections; and a cast cap adapted to be received in and close said socket after said chain sections have been assembled to said body, said cap providing first and second side weld surfaces for being welded respectively to said side sections of said fixture body to close the same, and forward and rear weld surfaces for being welded respectively to the distal ends of said partial link to complete the same.

2. The structure of claim 1 wherein the distal ends of said partial link each define elongated weld surfaces extending transverse of the direction of travel of said fixture and inclined away from said socket, said weld surfaces of said partial link cooperating with the forward and rear weld surfaces of said cap to provide transverse, elongated weld pockets.

3. The structure of claim 1 wherein said side sections of said fixture body each define elongated weld surfaces extending in the direction of travel of said fixture and diverging away from said socket to provide, in cooperation with the side weld surfaces of said cap, elongated weld pockets for welding said cap to the side sections of said fixture.

4. The structure of claim 2 wherein said fixture is a transverse flight for a conveyor comprising an integrally cast body having a face plate, top and bottom flanges and first and second side flanges, all of said flanges defining a symmetrical box shape, said face plate and said top flange defining a central cavity to provide said socket whereby said top flange has two side sections, and said partial link comprises a C-shaped link integrally cast with said body and located between the side sections of said top flange, said link having its distal ends adjacent the opposing inner sides of said top flange for receiving connecting links of adjacent chain sections.

5. The structure of claim 4 wherein the inner surfaces of said side sections of said top flange provide said weld surfaces extending in the direction of travel of said fixture, and wherein the sides of said cap provide first and second weld surfaces extending in the direction of travel of said link and adapted to oppose and diverge from an associated weld surface of a side section of said top flange in providing weld pockets for securing said cap to the body of said fixture.

6. The structure of claim 2 wherein said fixture is a log-hauling chair having a platform part integrally cast as a part of said fixture body and extending transversely of the direction of travel of said link, said platform being oriented in a generally horizontal plane when hauling a log and providing a plurality of transversely spaced upstanding projections adapted to bitingly engage a log supported thereon, said partial link being cast integrally and extending respectively from either side of said platform, the distal ends of said partial link opposing each other beneath said platform, said platform constituting the upper connection between the end loops of said partial link, said cap being adapted to be welded at its sides to said platform.

7. The structure of claim 6 wherein said cap is generally U-shaped in transverse section and elongated in the direction of travel of said fixture, said cap including a bottom wall and upstanding side walls, each of said side walls defining horizontal surfaces for abutting the undersurface of said platform of said fixture and being further provided with outwardly disposed weld surfaces inclined relative to said abutting surfaces to cooperate with the body of said platform in providing elongated weld pockets.

8. The structure of claim 2 wherein said fixture is a log-hauling chair comprising first and second integrally cast side sections, each transversely ribbed for strength, the upper surfaces of said side sections defining a concave supporting surface for a log, the lower portions of said side sections having longitudinally extending feet members for supporting said fixture on rails; said partial link being integrally cast with a lower platform extending between said side sections, the distal ends of said link opposing each other above said platform; said cap being adapted to be received in a socket defined by the distal ends of said partial link and the upper edges of said concave side sections, the upper surface of said cap being concave to complete the contour of said side sections in supporting a log, said cap further defining elongated side surfaces diverging away from their respective opposing side sections to provide weld pockets extending in the direction of travel of said link.

9. The structure of claim 8 wherein the platform of said body further includes an upstanding transverse rib extending between said side sections; and wherein said cap includes a depending integrally cast pedestal adapted to engage and be supported by said transverse rib of said body platform when said cap is welded to the body of said fixture.

10. The structure of claim 1 wherein said cap is an integrally cast body and said fixture is adapted to be inserted in a dual strand drag chain conveyor, said fixture including an integrally cast middle section spaced from said first and side sections to provide two sockets, and a second partial link with first and second end loops extending respectively in front of and behind said body, one end of each of said end loops of said second link being cast integrally with said body of said fixture, the other, distal end of each of said end loops of said second link being spaced from each other and from the spaced apart sections of the body of said fixture to define a second socket for receiving a second set of forward and rear link chain sections; and a second cast cap adapted to be received in the other of said sockets to close the same after said second set of chain link sections have been assembled and said second partial link, said second cap providing first and second side weld surfaces for being welded to said fixture body, and forward and rear weld surfaces for being welded respectively to the distal end of said second partial link to complete the same.

11. A flight for use in conveyor systems comprising an integrally cast body having a faceplate and first and second symmetrical side sections providing a box shape, said side sections further defining a central cavity; a C-shaped chain link integrally cast with said body and located in said cavity, said link having forward and rear end loops with spaced distal ends adjacent the top of said fixture for receiving solid links of adjacent chain sections of said conveyor system, the other ends of said loops being cast integrally with the body of said flight, whereby said flight completes said partial link; and a cap member adapted to be received by the distal ends of said end loops of said partial link, said cap being adapted to be welded to the opposing distal ends of said C-shaped link to complete the same and being further adapted to be welded at its sides to said side sections of said fixture body.

12. A fixture for a log-hauling link chain comprising an integrally cast body having a central platform extending transversely of the chain link and adapted to be oriented in a generally horizontal plane when hauling a log, said platform being equipped with a plurality of transversely spaced apart upstanding projections adapted to bitingly engage a log supported thereon, a pair of link end loops cast integrally with said platform, one end loop extending forward and the other rearward of said platform, both links being located beneath said platform, whereby said platform constitutes the upper connection between said end loops with the lower, distal ends of said end loops being longitudinally spaced apart; and an insert mounted between the spaced apart distal ends of said end loops, said insert providing a first pair of spaced apart surfaces abutting the underside of said platform, said insert further having a pair of longitudinally spaced apart surfaces abutting the distal ends of said end loops, said insert being adapted to be welded to said fixture adjacent each of said pairs of abutting surfaces.

13. A log chair fixture for a link chain comprising a unitary cast body having a central platform extending transversely of the chain and adapted to be oriented in a generally horizontal plane when hauling a log, said platform being integrally cast with first and second upstanding side sections, each of said side sections having a portion of its upper surface being concave to form a support bed for a log and further including lower feet members adapted to be supported by side rails, said fixture further comprising an integrally cast partial link having first and second end loops extending forward and rearward of said platform, one end of each link section being integrally cast with said platform, and the other, distal ends of each of said end loops being spaced apart in the direction of travel of said fixture and between the side sections thereof; and a cap having a generally H plan shape and being adapted to complete said fixture, said cap having first and second side surfaces elongated in the direction of travel of said fixture for providing weld surfaces for connecting said cap to the side sections of the body of said fixture, said cap further providing first and second elongated transverse surfaces on either side of the crossbar of said H shape and being adapted to provide weld surfaces for welding said cap to the distal ends of said link end loops, the upper surface of said cap when in assembled relation with said fixture body further having a concave surface to complete the bed contour of said fixture.

14. The structure of claim 13 wherein said platform further comprises a transverse rib extending between said side sections and defining an upper surface above the connecting portion of said link end loops; and said cap further comprises a depending pedestal adapted to engage the upper surface of the transverse rib of said platform for support.

* * * * *